(12) United States Patent
Fernie

(10) Patent No.: US 8,906,266 B2
(45) Date of Patent: Dec. 9, 2014

(54) PROCESS FOR THE PREPARATION OF HYDROGEN AND CARBON MONOXIDE CONTAINING GAS

(75) Inventor: Martin John Fernie, Amsterdam (NL)

(73) Assignee: Shell Oil Company, Houston, TX (US)

(*) Notice: Subject to any disclaimer, the term of this patent is extended or adjusted under 35 U.S.C. 154(b) by 303 days.

(21) Appl. No.: 13/265,351

(22) PCT Filed: Apr. 20, 2010

(86) PCT No.: PCT/EP2010/055213
§ 371 (c)(1),
(2), (4) Date: Nov. 29, 2011

(87) PCT Pub. No.: WO2010/122031
PCT Pub. Date: Oct. 28, 2010

(65) Prior Publication Data
US 2012/0061619 A1 Mar. 15, 2012

(30) Foreign Application Priority Data
Apr. 22, 2009 (EP) .................... 09158479

(51) Int. Cl.
*C01B 3/22* (2006.01)
*C01B 3/24* (2006.01)
*C01B 3/26* (2006.01)
*C01B 3/38* (2006.01)

(52) U.S. Cl.
CPC ........... *C01B 3/382* (2013.01); *C01B 2203/061* (2013.01); *C01B 2203/1241* (2013.01); *C01B 2203/062* (2013.01); *C01B 2203/0244* (2013.01); *C01B 2203/142* (2013.01); *C01B 2203/141* (2013.01); *C01B 2203/0233* (2013.01); *C01B 3/384* (2013.01); *C01B 2203/0844* (2013.01)

USPC ......................................... 252/373

(58) Field of Classification Search
USPC ......................................... 252/373
See application file for complete search history.

(56) References Cited

U.S. PATENT DOCUMENTS 4,079,017 A   3/1978   Crawford et al.
4,822,521 A * 4/1989   Fuderer ..................... 252/376
(Continued)

FOREIGN PATENT DOCUMENTS

EP   1106570   6/2001   ............... C01B 3/38
EP   1403216   3/2004   ............... C01B 3/38
(Continued)

OTHER PUBLICATIONS

Kolb et al, "Integrated Microstructured Fuel Processors for Fuel Cell Applications", Chemical Engineering Research & Design, Part A, Institution of Chemical Engineers, vol. 83, No. 6, 2005, pp. 626-633.
(Continued)

*Primary Examiner* — Wayne Langel

(57) ABSTRACT

Process for the preparation of hydrogen and carbon monoxide containing gas from a gaseous carbonaceous feedstock by performing the following steps: (a) auto-thermal reforming of a gaseous feedstock thereby obtaining a first gaseous mixture of hydrogen and carbon monoxide, (b) catalytic steam reforming of the gaseous carbonaceous feedstock to obtain a second gaseous mixture of hydrogen and carbon monoxide by feeding steam and the gaseous carbonaceous feedstock through a first set of numerous microchannels provided with a steam reforming catalyst and feeding the first gaseous mixture of hydrogen and carbon monoxide through a second set of numerous microchannels, wherein the first and second set of microchannels are oriented such that the required heat for the steam reforming reaction in the first set of microchannels is provided by convective heat exchange from the second set of microchannels, thereby obtaining the hydrogen and carbon monoxide containing gas as the effluent of the second set of microchannels.

10 Claims, 3 Drawing Sheets

(56) References Cited

U.S. PATENT DOCUMENTS

| | | | |
|---|---|---|---|
| 6,224,789 B1 | 5/2001 | Dybkjaer | 252/373 |
| 7,087,652 B2 | 8/2006 | Abbott et al. | 518/700 |
| 7,250,151 B2 * | 7/2007 | Tonkovich et al. | 423/659 |
| 7,722,854 B2 * | 5/2010 | Watson et al. | 423/652 |
| 7,780,944 B2 * | 8/2010 | Mathias et al. | 423/650 |
| 8,003,073 B2 * | 8/2011 | Pez et al. | 423/651 |
| 8,062,623 B2 * | 11/2011 | Daly et al. | 423/651 |
| 2003/0072699 A1 * | 4/2003 | Tonkovich et al. | 422/190 |
| 2004/0105812 A1 * | 6/2004 | Tonkovich et al. | 423/650 |
| 2005/0171217 A1 | 8/2005 | Bowe et al. | |
| 2007/0140955 A1 * | 6/2007 | Tonkovich et al. | 423/652 |

FOREIGN PATENT DOCUMENTS

| | | | |
|---|---|---|---|
| WO | WO2004037418 | 5/2004 | B01J 35/04 |
| WO | WO2004096952 | 11/2004 | C10G 2/00 |

OTHER PUBLICATIONS

Tonkovich, A.Y. et al.; Microchannel Process Technology for Compact Methane Steam Reforming:; Chemical Engineering Science, vol. 59, No. 22-23;pp. 4819-4824; Nov. 1, 2004.

Sohn et al.; "Development of the Integrated Methanol Fuel Processor Using Micro-Channel Patterned Devices and its Performance for Steam Reforming of Methanol"; International Journal of Hydrogen Energy; Elsevier Science Publishers B.V.; vol. 32, No. 18; pp. 5103-5108; Nov. 29, 2007.

* cited by examiner

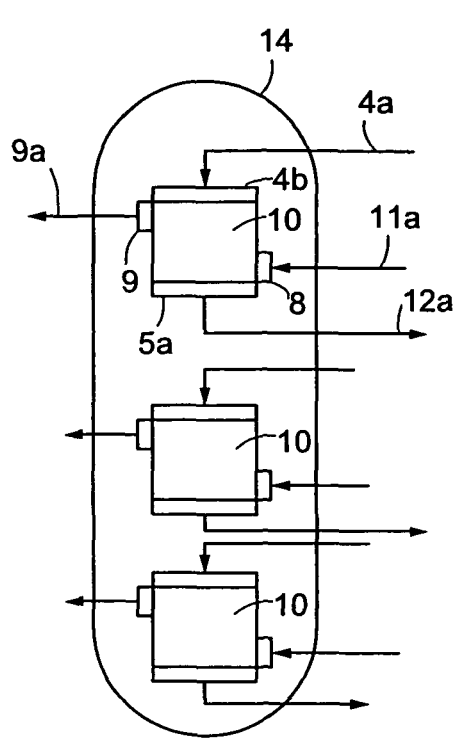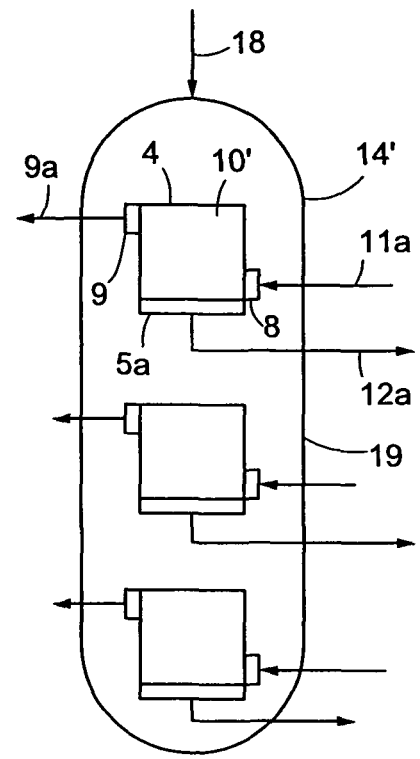
Fig. 3                Fig. 3a
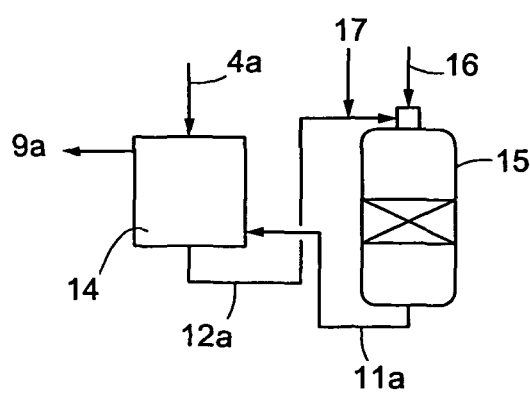
Fig. 4

PROCESS FOR THE PREPARATION OF HYDROGEN AND CARBON MONOXIDE CONTAINING GAS

PRIORITY CLAIM

The present application claims priority from PCT/EP2010/055213, filed 20 Apr. 2010, which claims priority from European Application 09158479.7, filed 22 Apr. 2009.

BACKGROUND

The invention is directed to a process for the preparation of hydrogen and carbon monoxide containing gas from a gaseous carbonaceous feedstock. The process involves the combination of an auto-thermal reforming process and a heat exchange catalytic steam reforming process.

Such a process is described in U.S. Pat. No. 7,087,652. This process involves steam reforming of natural gas in a multi-tubular heat exchange reformer to obtain a reformed gas. This reformed gas is subsequently fed to an auto-thermal reformer (ATR) to obtain an auto-thermal reformer effluent. This effluent is used as the hot gas to provide heat in the heat exchange reformer. The heat exchange reformer is a shell and tube vessel, wherein the reforming catalyst is present in the tubes and where the hot effluent of the ATR flows at the shell side.

U.S. Pat. No. 6,224,789 describes a process involving steam reforming of natural gas in a multi-tubular heat exchange reformer to obtain a reformed gas. In parallel another part of the natural gas is fed to an auto-thermal reformer (ATR) to obtain an auto-thermal reformer effluent. This effluent is used as the hot gas to provide heat in the heat exchange reformer. The reformed gas and the effluent of the ATR after being used as hot gas is combined to obtain a hydrogen and carbon monoxide containing gas as the product of this process.

In both prior art processes the heat exchange reformer is typically a large multi-tubular reactor with several hundred catalyst tubes in a vessel which is 20-30 m high by 4-7 m diameter. Such a unit comprises several tubesheets, refractory lining, heat exchange enhancements such as baffles and sheath-tubes on the shell-side, making the unit difficult to manufacture.

Mixtures of hydrogen and carbon monoxide, sometimes referred to as synthesis gas or syngas, are used as feedstock to a variety of processes to make chemicals, oil products and/or power. When the mixture is used as feed to a Fischer-Tropsch process or to a methanol synthesis process it is sometimes desirable to use a mixture having a hydrogen to carbon monoxide molar ratio of around 2. When preparing such a mixture in the above processes it is found that one will preferably operate at low steam to carbon ratio's. Operation at such conditions in turn results in the synthesis gas mixture as prepared being in the metal dusting corrosion region and as such being very aggressive towards low alloy steel grades. Because of this metal-dusting corrosion special high alloy steel grades resistant to metal dusting will have to be used for the heat exchange surfaces of the heat exchange reformer. Such steel grades are very expensive and add to the cost of the unit.

It is known that the allowable pressure differential at the high temperatures of the above processes for such high alloy steel grades is limited. As a result special instrument protective systems have to be installed to avoid such pressure differentials when the process is in operation. This adds to the complexity of the process.

SUMMARY OF INVENTION

The aim of the present invention is to provide a process, which overcomes the above problems.

This is achieved with the following process. Process for the preparation of hydrogen and carbon monoxide containing gas from a gaseous carbonaceous feedstock by performing the following steps:
(a) auto-thermal reforming of a gaseous feedstock thereby obtaining a first gaseous mixture of hydrogen and carbon monoxide,
(b) catalytic steam reforming of the gaseous carbonaceous feedstock to obtain a second gaseous mixture of hydrogen and carbon monoxide by feeding steam and the gaseous carbonaceous feedstock through a first set of numerous microchannels provided with a catalytic steam reforming function and feeding the first gaseous mixture of hydrogen and carbon monoxide through a second set of numerous microchannels, wherein the first and second set of microchannels are oriented such that the required heat for the steam reforming reaction in the first set of microchannels is provided by convective heat exchange from the second set of microchannels, thereby obtaining the hydrogen and carbon monoxide containing gas as the effluent of the second set of microchannels.

BRIEF DESCRIPTION OF THE DRAWINGS

FIGS. 3 and 3a illustrate a pressure vessel containing more than one heat exchange reformer.

FIG. 4 shows how a combined heat exchange reformer is used in a process line-up according to the invention.

DETAILED DESCRIPTION

Figure 1:
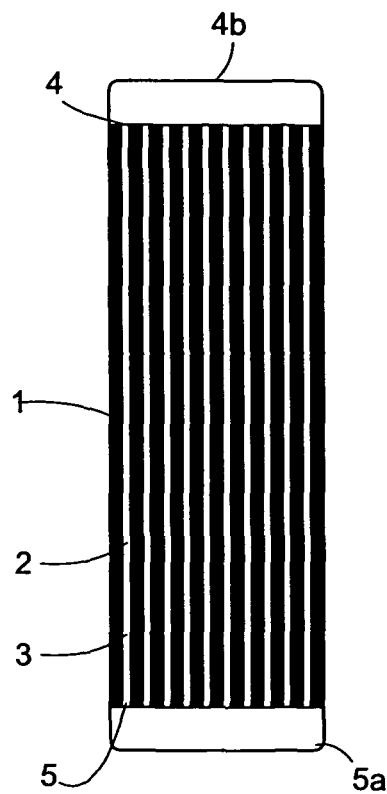
FIG. 1 illustrates a preferred configuration for the first and second set of microchannels.
Figure 1:
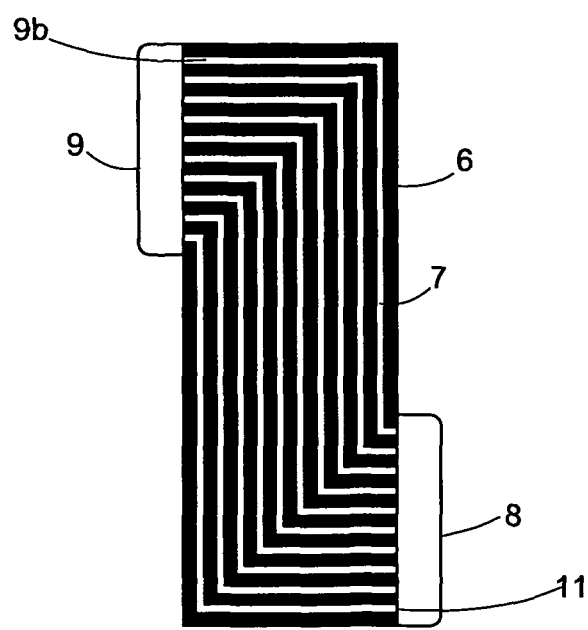

Applicants found that the heat exchange catalytic steam reforming can be performed in more simple equipment, which mitigates several of the disadvantages of the heat exchange reformer reactor of the prior art. The allowable pressure differential in microchannel reactor is higher than in the prior art reactor design. Furthermore due to the enhanced heat transfer performance of the microchannel reactor the required heat transfer area can be much less. This may result in a reduction in the content of high alloy steel in the reactor of 60% as compared to the prior art reactors. This is advantageous in reducing cost and reactor size because such high alloy steel is expensive and difficult to obtain. Further advantages are the smaller plot size required for the process according to the invention. Further advantages will be described when discussing the below preferred embodiments.

The gaseous carbonaceous feedstock used in step (b) is preferably a methane comprising gas. The methane comprising gas can be obtained from various sources such as natural gas, refinery gas, associated gas or coal bed methane and the like. The gaseous carbonaceous feedstock suitably comprises mainly, i.e. more than 90 v/v %, especially more than 94%, $C_{1-4}$ hydrocarbons, especially comprises at least 60 v/v percent methane, preferably at least 75 volume percent, more preferably at least 90 volume percent. Preferably natural gas or associated gas is used as the gaseous carbonaceous feedstock.

In a preferred embodiment the gaseous feedstock in step (a) is a methane comprising gas. More preferably it is the same methane comprising gas as used as the gaseous carbonaceous feedstock in step (b). In such an embodiment it is furthermore preferred to feed a combination of the first and second gaseous mixtures of hydrogen and carbon monoxide through the second set of numerous microchannels. Such a configuration is also referred to as a parallel process configuration.

More preferably the process is performed in a series configuration wherein all or part of the second gaseous mixture of hydrogen and carbon monoxide is used as the gaseous feedstock of step (a). Because the steam reforming equilibrium temperature achieved in step (a) is higher, for example between 1000 and 1100° C., compared to step (b), for example between 800 and 900° C., a higher conversion of methane is achieved in a series configuration. This results in a more efficient process. In such a series configuration the gaseous feedstock in step (a) may suitably comprise all or part of the second gaseous mixture of hydrogen and carbon monoxide and another part of the gaseous carbonaceous feedstock.

In any of the embodiments described above it has been found that the temperature of the gas as it enters the second set of microchannels is advantageously between 800 and 1100° C. Higher temperatures are presently not possible due to the limitations of the materials of construction.

For some applications, like for example a cobalt catalysed Fischer-Tropsch process as performed in a fixed bed reactor, it is found advantageous to use a mixture of carbon monoxide and hydrogen having a $H_2$ over CO molar ratio of between 1.5 and 2.1. Such a desired molar ratio can be achieved with the process according to the invention by feeding a carbon dioxide rich gas to step (a) at such a rate that the content of carbon dioxide, on a dry basis, in the total feed to step (a) is between 1 and 10 vol. %. Such a $CO_2$ rich gas may suitably the off-gas as produced as by-product in the Fischer-Tropsch synthesis itself.

Step (a) is an auto-thermal reformer, which technology is well known to the skilled person.

In step (b) the gaseous carbonaceous feedstock is converted to the second gaseous mixture of hydrogen and carbon monoxide by means of a steam reforming reaction, which takes place in the presence of a reforming catalyst as present in the first set of numerous microchannels. Steam reforming itself is well known and will not be dealt with in great detail. Preferably the steam to carbon molar ratio of the feed to the first set of numerous microchannels in step (b) is between 0.5 and 3.0.

The first gaseous mixture is fed through the second set of microchannels. Because the first gaseous mixture has a relatively high temperature heat is transferred to the first set of microchannels to perform the endothermic reforming reaction.

In order to achieve the most optimal heat exchange the first and second set of microchannels are preferably arranged alternately to ensure good thermal contact between the channels. Channels in individual steel plates suitably form the microchannels. The steel plates are preferably stacked and diffusion bonded together. Preferably the microchannels of the first and second set are positioned such that the flow direction in the first set of microchannels is substantially counter-current with the flow direction in the second set of microchannels.

The number of microchannels in such plate may vary from more than 10 to more than 10000. The microchannel in such a plate preferably has a height of 5 mm or less, more preferably 2 mm or less, and still more preferably 1 mm or less, and in some preferred embodiments height is in the range of 0.1 and 2 mm. Channel cross-sections can be, for example, rectangular, circular, triangular, or irregularly shaped. Height and width are perpendicular to length and either or both can vary along the length of a microchannel. Height and width can be arbitrarily selected; in the present invention, height is defined as the smallest dimension of a channel that is perpendicular to flow.

The thickness of a steel plate is preferably such that the sufficient heat transfer is possible, while at the same time sufficient mechanical strength is provided. The thickness will thus depend on the type of material chosen for the plate and the dimensions of the microchannel. Suitably the thickness is between 0.2 and 4 mm.

The steel plates, and preferably the steel plates which come into contact with the first gaseous mixture, are preferably made of a metal alloy, which can withstand metal dusting. Such high alloy steel will preferably comprises between 0 and 20 wt % iron, between 0 and 5 wt % aluminium, between 0 and 5 wt % silicon, between 20 and 50 wt % chromium and at least 35 wt % nickel. More preferably the content of chromium in the metal alloy is more than 30 wt %. More preferably the metal alloy comprises between 1 and 5 wt % aluminium. More preferably the metal alloy comprises between 1 and 5 wt % silicon. More preferably the metal alloy comprises between 0 and 2 wt % titanium and/or REM.

The first set of microchannels will comprise a reforming catalytic function. This may be a typical reforming catalyst known to the skilled person. The method of loading the catalyst in said microchannels is described in for example WO-A-2004037418. A suitable method is to wash coat a steam reforming catalyst on a to the inner surfaces of the microchannels.

A preferred configuration for the first and second set of microchannels is described in FIG. 1. FIG. 1 shows plate 1 and numerous microchannels 2 forming the first set of numerous microchannels provided with a steam reforming catalyst 3. Microchannels 2 have an inlet end 4 for the gaseous carbonaceous feedstock and an outlet end 5 for the second gaseous mixture of hydrogen and carbon monoxide. FIG. 1 also shows plate 6 and numerous microchannels 7 forming the second set of numerous microchannels. Microchannels 7 are provided with inlet openings 11 fluidly connected to a common header channel 8 through which the first gaseous mixture is supplied to the numerous microchannels 7. At the downstream end 9b of the microchannels 7 the cooled gas is collected in a common header 9.

Figure 2:
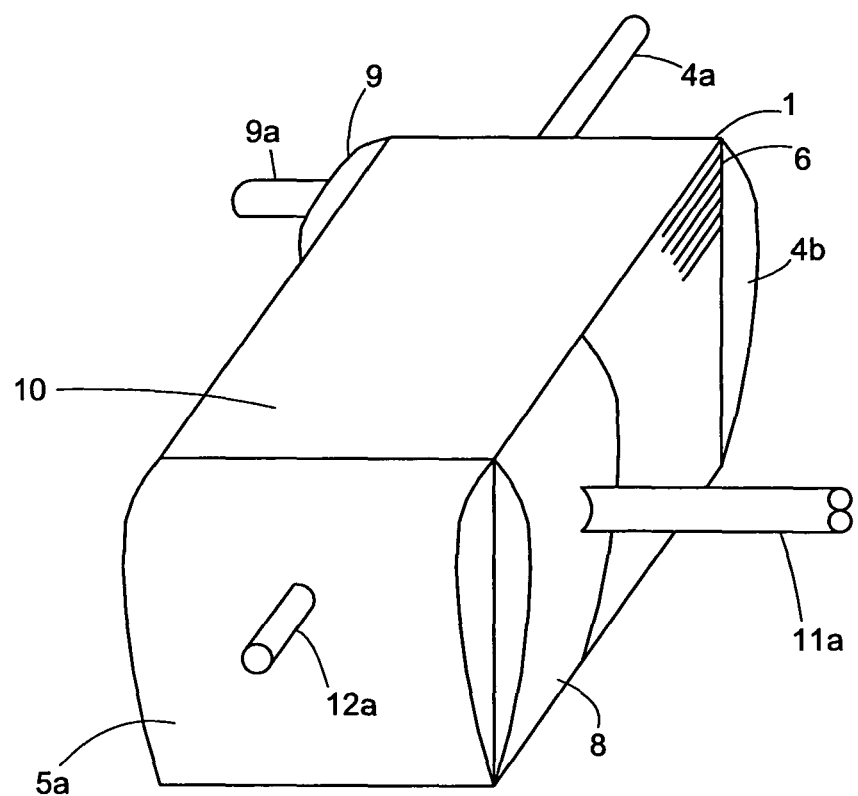
FIG. 2 illustrates a stacked plate heat exchange reformer.

FIG. 2 illustrates a stack of plates 1 and 6 arranged alternately to form the heat exchange reformer 10 which may be advantageously used in the process according to the invention. The number of plates 1 and 6 will typically be greater than shown. FIG. 2 also shows header 8, header 9, header 5a and header 4b. These headers are welded around the inlet and outflow openings as present in plates 1 and 6. Header 8 is fluidly connected to inlet 11a. Header 9 is fluidly connected to outlet 9a. Header 4b is fluidly connected to inlet 4a and header 5a is fluidly connected to outlet 12a.

FIG. 3 shows an embodiment wherein more than one heat exchange reformer 10 is positioned in a single pressure vessel 13 to form a combined heat exchange reformer 14. Only the inlets 4a, 11a and outlets 9a and 12a for the various streams pass the pressure vessel wall making the design of the combined heat exchange reformer 14 more simple. Alternatively header 4b and inlet 4a may be omitted to obtain reformer 10' modules and combined heat exchange reformer 14' as shown in FIG. 3a. The gaseous carbonaceous feedstock and steam, being the coldest gas stream, will then be provided by a single inlet 18 directly into the interior of the pressure vessel 19 or 14'. The inner wall of vessel 19 is preferably refractory lined.

FIG. 4 shows how combined heat exchange reformer of FIG. 3 or 3a is used in a process line-up according to the present invention. To combined heat exchange reformer 14 a mixture of steam and a methane comprising gas is fed via inlet 4a. The resulting second gaseous mixture of hydrogen and carbon monoxide is fed via 12a to auto-thermal reformer 15. To said auto-thermal reformer 15 also oxygen, via 16, and a $CO_2$ comprising gas and a gaseous carbonaceous feedstock such as methane are fed, via 17. The resulting first gaseous mixture of hydrogen and carbon monoxide is fed via 11a to combined heat exchange reformer 14. The product of the process, namely the hydrogen and carbon monoxide containing gas as discharged from the second set of microchannels, is discharged from the reformer 14 via 9a.

What is claimed is:

1. A process for the preparation of hydrogen and carbon monoxide containing gas from a gaseous carbonaceous feedstock comprising the following steps:
    (a) auto-thermal reforming a first gaseous carbonaceous feedstock thereby obtaining a first gaseous mixture of hydrogen and carbon monoxide,
    (b) catalytic steam reforming a second gaseous carbonaceous feedstock to obtain a second gaseous mixture of hydrogen and carbon monoxide by feeding steam and the second gaseous carbonaceous feedstock through a first set of numerous microchannels provided with a steam reforming catalyst and feeding the first gaseous mixture of hydrogen and carbon monoxide through a second set of numerous microchannels, wherein the first and second set of microchannels are oriented such that the required heat for the steam reforming reaction in the first set of microchannels is provided by convective heat exchange from the second set of microchannels, thereby obtaining the hydrogen and carbon monoxide containing gas as the effluent of the second set of microchannels, wherein the first and second set of microchannels are arranged alternately to ensure good thermal contact between the channels and wherein the microchannels are formed by channels in individual steel plates which are stacked and diffusion bonded together and wherein the steel plates are made of an metal alloy comprising between 0 and 20 wt % iron, between 0 and 5 wt % aluminium, between 0 and 5 wt % silicon, between 20 and 50 wt % chromium and at least 35 wt % nickel.

2. A process according to claim 1, wherein the first gaseous carbonaceous feedstock in step (a) and the second gaseous carbonaceous feedstock to step (b) is a methane comprising feedstock and wherein a combination of the first and second gaseous mixtures of hydrogen and carbon monoxide is fed through the second set of numerous microchannels.

3. A process according to claim 1, wherein the first gaseous carbonaceous feedstock in step (a) comprises all or part of the second gaseous mixture of hydrogen and carbon monoxide and another part of the second gaseous carbonaceous feedstock.

4. A process according to claim 1, wherein a carbon dioxide rich gas is fed to step (a) at such a rate that the content of carbon dioxide, on a dry basis, in the total feed to step (a) is between 1 and 10 vol. %.

5. A process according to claim 1, wherein the content of chromium in the metal alloy is more than 30 wt %.

6. A process according to claim 1, wherein the metal alloy comprises between 1 and 5 wt % aluminium.

7. A process according to claim 1, wherein the metal alloy comprises between 1 and 5 wt % silicon.

8. A process according to claim 1, wherein the metal alloy comprises between 0 and 2 wt % titanium and/or REM.

9. A process according to claim 1, wherein the steam to carbon molar ratio of the feed to the first set of numerous microchannels in step (b) is between 0.3 and 3.0.

10. A process according to claim 1, wherein the temperature of the gas as it enters the second set of microchannels is between 800 and 1100° C.

* * * * *